(No Model.)  2 Sheets—Sheet 1.

C. S. LOCKE.
REEL FOR CHECK ROW WIRES.

No. 292,831.   Patented Feb. 5, 1884.

Witnesses
Thos. H. Hutchins,
Wm. J. Hutchins.

Inventor.
Charles S. Locke.

(No Model.) 2 Sheets—Sheet 2.
C. S. LOCKE.
REEL FOR CHECK ROW WIRES.
No. 292,831. Patented Feb. 5, 1884.

Witnesses
Thos. H. Hutchins.
Wm. J. Hutchins.

Inventor
Charles S. Locke.

UNITED STATES PATENT OFFICE.

CHARLES S. LOCKE, OF JOLIET, ILLINOIS.

REEL FOR CHECK-ROW WIRES.

SPECIFICATION forming part of Letters Patent No. 292,831, dated February 5, 1884.

Application filed October 20, 1883. (No model.)

*To all whom it may concern:*

Be it known that I, CHARLES S. LOCKE, a citizen of the United States of America, residing at Joliet, in the county of Will and State of Illinois, have invented certain new and useful Improvements in Reels for Check-Row Wires, of which the following is a specification, reference being had therein to the accompanying drawings.

Figure 1:
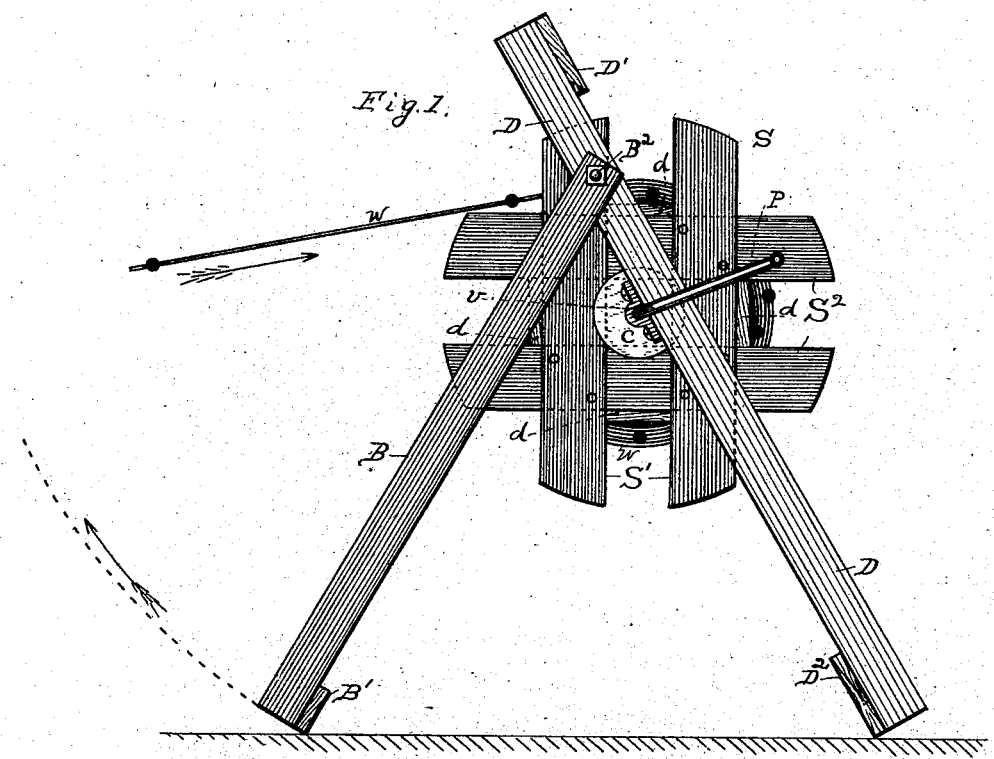
Figure 2:
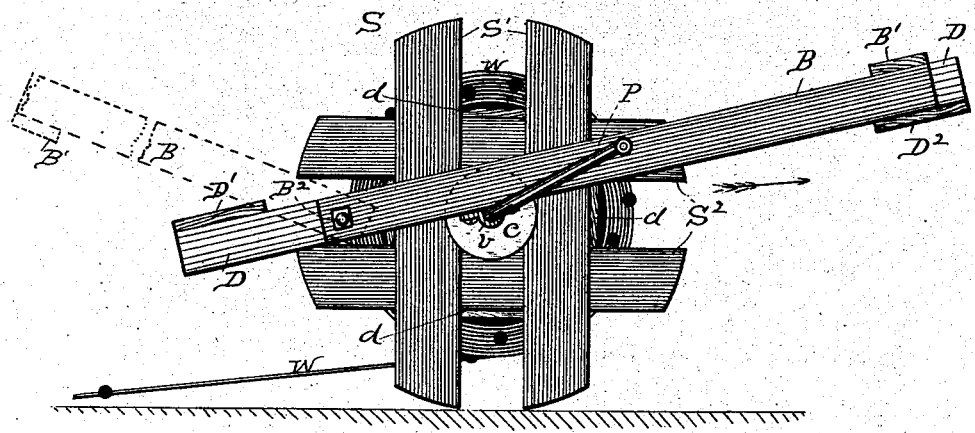
Figure 3:
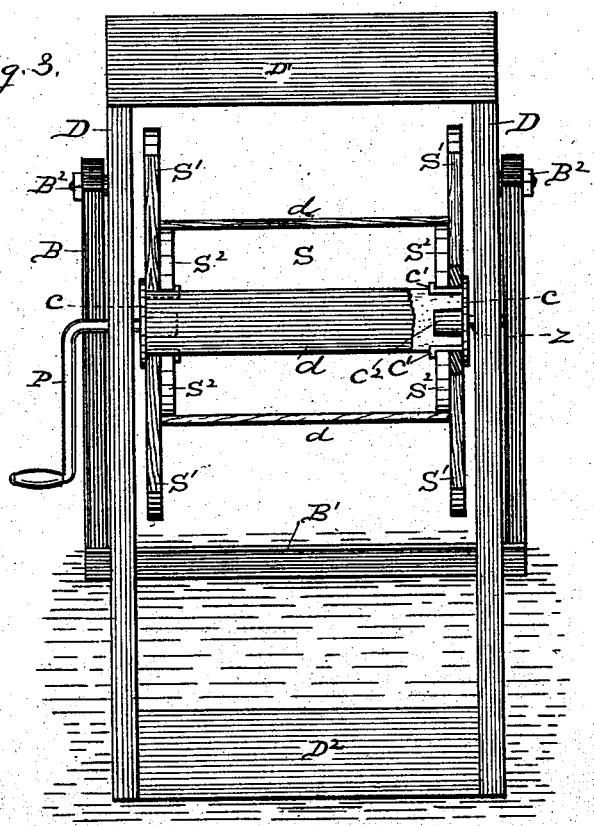

Figures 1 and 2 are end elevations; Fig. 3, a front elevation, with a portion of the reel broken away; and Fig. 4, a perspective view of the reel-head.

This invention relates to certain improvements in reels for check-row wires, the construction and operation of which I will set forth in the following specification and claims.

Referring to the drawings, D and B represent a pair of rectangular frames, the frame B being shorter than frame D, and the two pivoted together, as shown at $B^2$, in such manner that frame B can fold onto frame D, as shown by the dotted lines in Fig. 2. When standing as shown in Figs. 1 and 3, they form the stand to support the reel S, which is boxed in frame D, so it can be revolved by means of the crank P, to wind up the check-row wire, as shown in said figure. The reel S is formed of the end pieces, $S'$ $S^2$, (each end being alike,) upon which the cross-bars $d$ are firmly nailed, as shown, forming the surface upon which the wire is wound. The reel S is cut circular, as shown, so it can roll like a wheel on the ground, for the purpose of paying out the wire W as it rolls, as shown in Fig. 2, in which case the frame B folds over onto frame D, as shown in said figure, so the cross-bars $B'$ and $D'$ form means for drawing the reel along by hand, or for attachment to the planter or a wagon, for transporting it for said purpose, thus saving the trouble of loading up the reel on a wagon or planter to pay out the wire, as is done in other machines of this class. The cross-bars $B'$ $D^2$ are attached to the extreme lower end of their respective frames, to furnish a permanent rest on the ground, so as to prevent the ends of the frames from sinking into the soft earth, and thereby prevent the stand from falling over easily.

Figure 4:
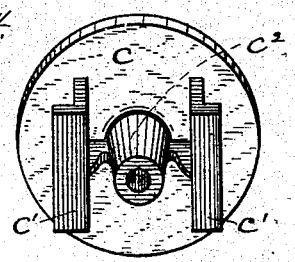

The ends of the reel S are each provided with the metal head, such as is shown in Fig. 4, having a central hub, $c^2$, and a pair of hooked lugs, $c'$ $c'$. When the end pieces are nailed together, the inner pair are placed in behind the lugs, as shown in Fig. 3, while the outer pair lie across on each end of the lugs, so that the head is thus inclosed by means of the lugs within the four cross-pieces and held therein by means of the hooks. The hub at one end of the reel turns on the stud $z$ for its axle, while the crank P at the other end forms the other axle, and is either integral with said head, or is made separate and with a square end, to enter a square opening in the hub, so it will rotate the reel. By this construction no bolts or screws are necessary for attaching the hub to the reel, and furnishes a very strong and permanent hub, easy to apply and easily replaced if broken. The hub $c^2$ is made rather long, so as to have a long bearing on its axle, to prevent wear.

I am aware reel-stands have been made to fold something like this, but not in such manner, or for the purpose of furnishing means for rolling the reel S along on the ground to pay out the wire, nor with the cross-bars $B'$ and $D^2$ at the extreme end, to form a rest on the ground to support the reel, as in this case. Neither am I aware of the use of any such reel, circular in form, for the purpose of rolling on the ground to pay out the wire; nor am I aware of the use of any such reel-heads as is shown in Fig. 4, having the flanges for their attachment to the reel without screw or bolts.

By the use of four cross-pieces, $S'$ $S^2$, for the ends of the reels, instead of two, as is usually the case, its peripheral surface is more easily distributed than it otherwise would be, so it will roll more easily and with less jolt and jar.

Sometimes the wire W might be wound upon the reel in the opposite direction from that shown in Figs. 1 and 2. In such case the reel would roll in the opposite direction from that shown in Fig. 2 to pay out the wire by resting the outer end of the frame B on the planter and making it fast to the cross-arm $B'$, as shown by the dotted lines in said figure.

Having thus described my invention, what

I claim as new, and desire to secure by Letters Patent, is as follows, to wit:

1. The reel S for check-row wires described, having the heads $c$, hubs $c^2$, and hooked lugs $c'$ $c'$, in combination with a supporting-frame, as and for the purpose set forth.

2. In a reel for check-row wires, the head $c$, having the hub $c^2$ and hooked lugs $c'$ $c'$, in combination with the reel S, as and for the purpose set forth.

CHARLES S. LOCKE.

Witnesses:
 THOS. H. HUTCHINS,
 W. J. HUTCHINS.